United States Patent [19]
Ogikubo

[11] Patent Number: 6,038,370
[45] Date of Patent: Mar. 14, 2000

[54] RECORDING AND/OR REPRODUCING DEVICE AND ITS METHOD

[75] Inventor: Junichi Ogikubo, Kanagawa, Japan

[73] Assignee: Sony Corporation, Tokyo, Japan

[21] Appl. No.: 08/918,291

[22] Filed: Aug. 25, 1997

[30] Foreign Application Priority Data

Aug. 29, 1996 [JP] Japan ................................. 8-247029

[51] Int. Cl.[7] .................................................. H04N 5/91
[52] U.S. Cl. ............................... 386/96; 386/82; 360/48
[58] Field of Search ............................. 386/6–8, 33, 40, 386/68, 81–82, 96–106, 111–112, 124; 360/18, 27, 48

[56] References Cited

U.S. PATENT DOCUMENTS

5,687,275  11/1997  Lane et al. .............................. 386/68
5,774,289   6/1998  Seki ......................................... 360/48
5,960,148   9/1999  Miyazawa .............................. 386/111

Primary Examiner—Thai Tran
Assistant Examiner—Christopher Onuaku
Attorney, Agent, or Firm—Frommer Lawrence & Haug, LLP; William S. Frommer

[57] ABSTRACT

A recording and/or reproducing device and its method capable of alleviating the noise generated in the audio-output at the time of the variable speed reproduction mode. At the time of recording, a series of audio data is recorded on a tape recording medium, in units of plural data blocks respectively for each first unit, and an identification code for each first unit is added whereto; on the other hand, at the time of reproduction, the identification codes of the reproduced data blocks are sequentially detected, the most frequent identification code are inferred for each stated period from the result of the detection, and, when the identification code of the data block is other than the most frequent identification code, the identification code of the immediately preceding data block is held and sent out, and the stated interpolation process is performed when the output transfers to the succeeding audio data of the data block of the most frequent identification code.

8 Claims, 10 Drawing Sheets

RECORDING AND/OR REPRODUCING DEVICE AND ITS METHOD

BACKGROUND OF THE INVENTION

1. Field of the Invention

The present invention relates to a recording/reproducing device and its method and a reproducing device and its method, and is applicable to a video cassette recorder (VCR) for example.

2. Description of the Related Art

In recent years, VCR has spread which can perform inter-frame coding of the video data for each GOP and recording of it, treating plural frames as a unit (hereinafter, this is referred to as a GOP).

Figure 1:
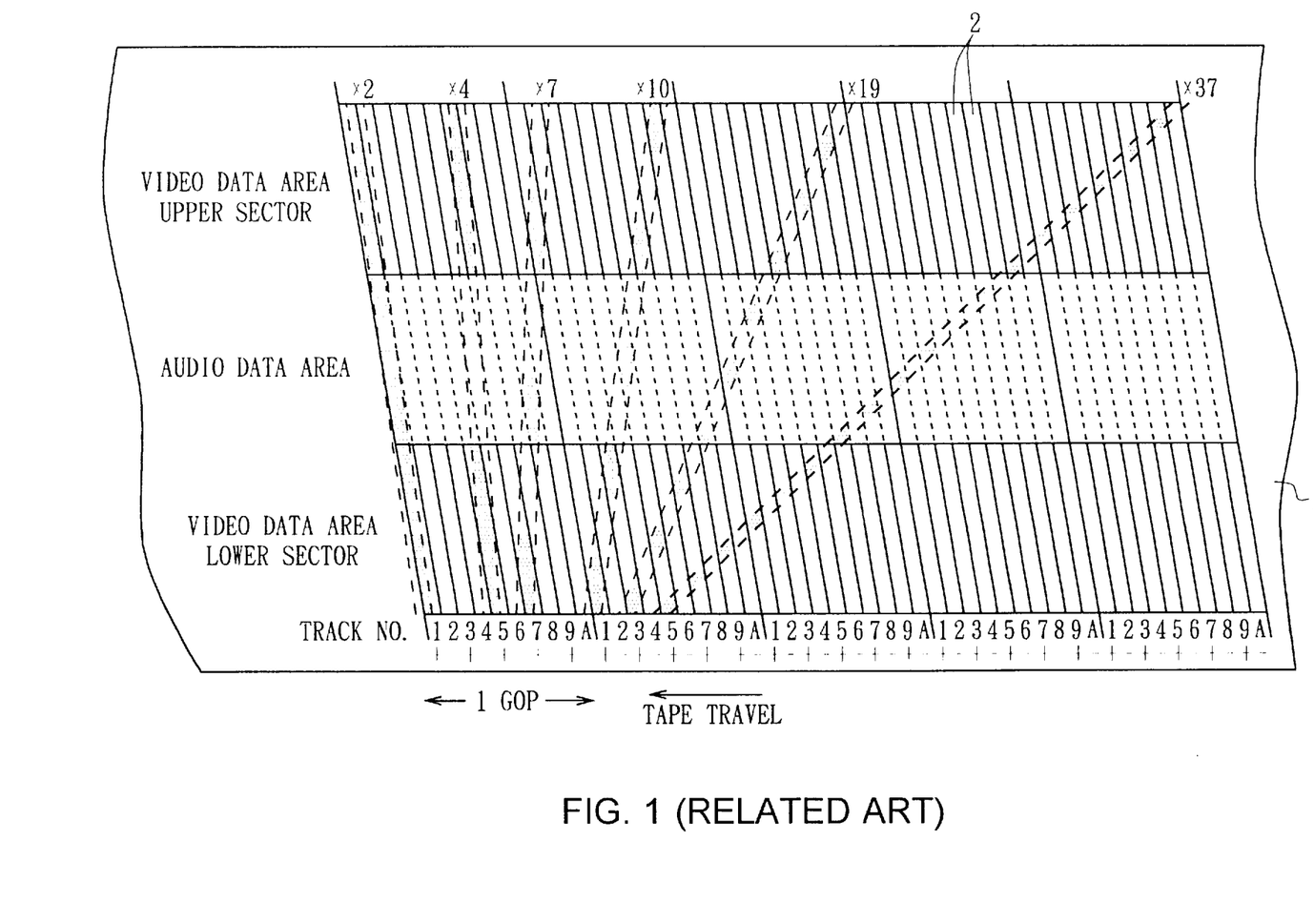
FIG. 1 is a schematic diagram showing a scanning track of a reproducing head of the time of the shuttle mode.

In such a VCR, usually, video data and audio data of one GOP are respectively divided into plural data blocks which are having the stated length, and these data blocks are respectively recorded in the corresponding recording areas in the stated number (ten, in FIG. 1) of recording tracks 2 which are formed on the magnetic tape 1 as shown in FIG. 1.

By the way, in a VCR, at the time of variable speed reproducing mode (hereinafter, this is referred to as shuttle mode), a reproducing head has been generally adapted to be caused to intersect the recording tracks 2 of the number corresponding to the speed which is variable, by running of the magnetic tape 1 at the speed corresponding to the specified reproducing speed.

Figure 2:
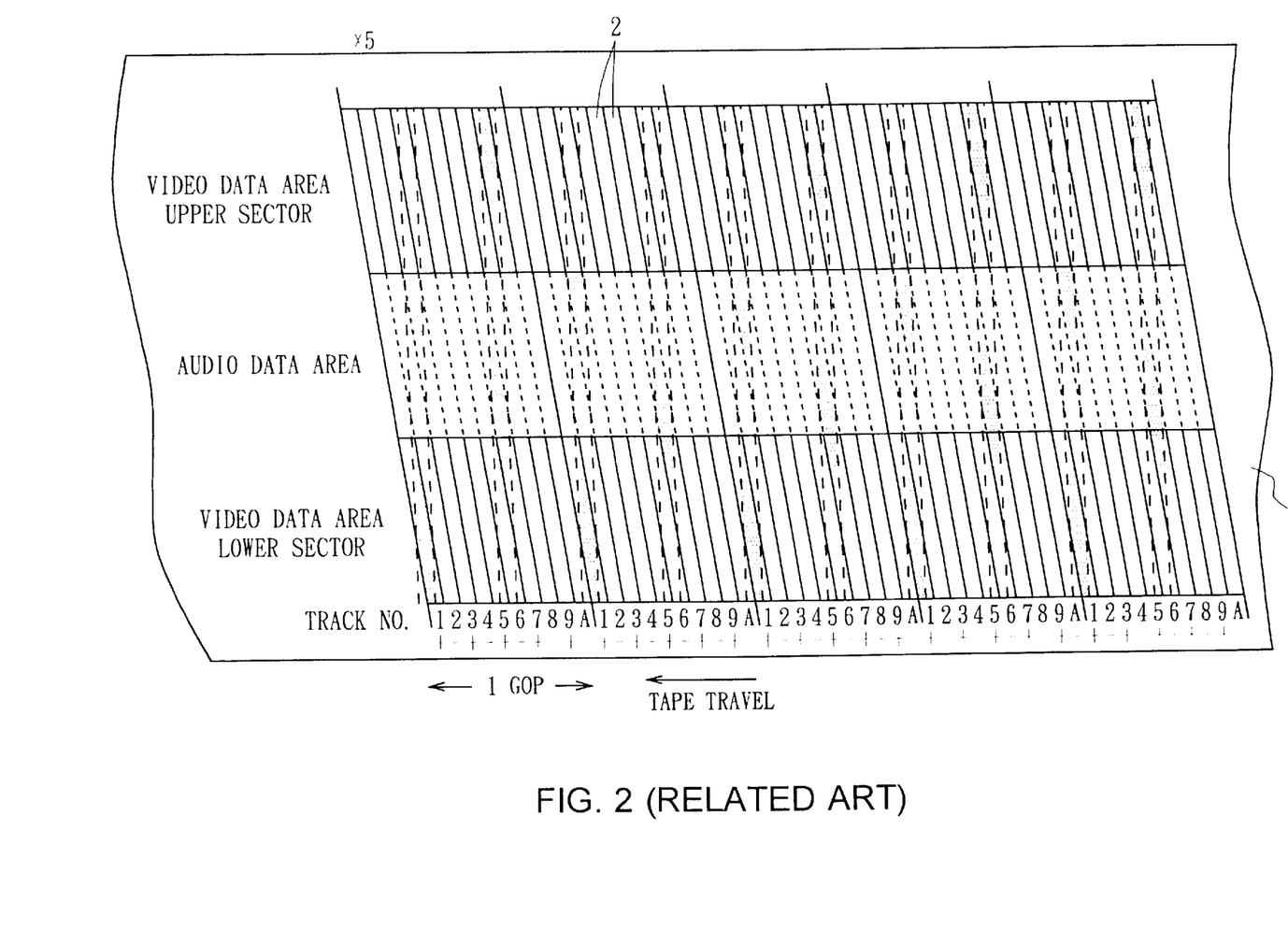
FIG. 2 is a schematic diagram showing a scanning track of a pair of reproducing heads of the time of the quintuple speed reproduction.

Hereby, in a VCR, recorded data can be reproduced from the plural recording tracks 2 with one time of scanning of the reproducing head, and thus variable reproduction can be performed at the specified reproducing speed, as shown in, for instance, FIG. 2. In this connection, FIG. 2 shows the scan trace upon the magnetic tape 1 of scanning of a pair of reproducing heads at the time of quintuple speed.

In this case, in a VCR which is adapted to record the video data and the audio data for each GOP on the magnetic tape treating the plural data blocks as a unit as stated above, as known by FIG. 1, the data which is obtained becomes a mixture of plural GOPs, as the reproducing speed goes high.

Figure 3:
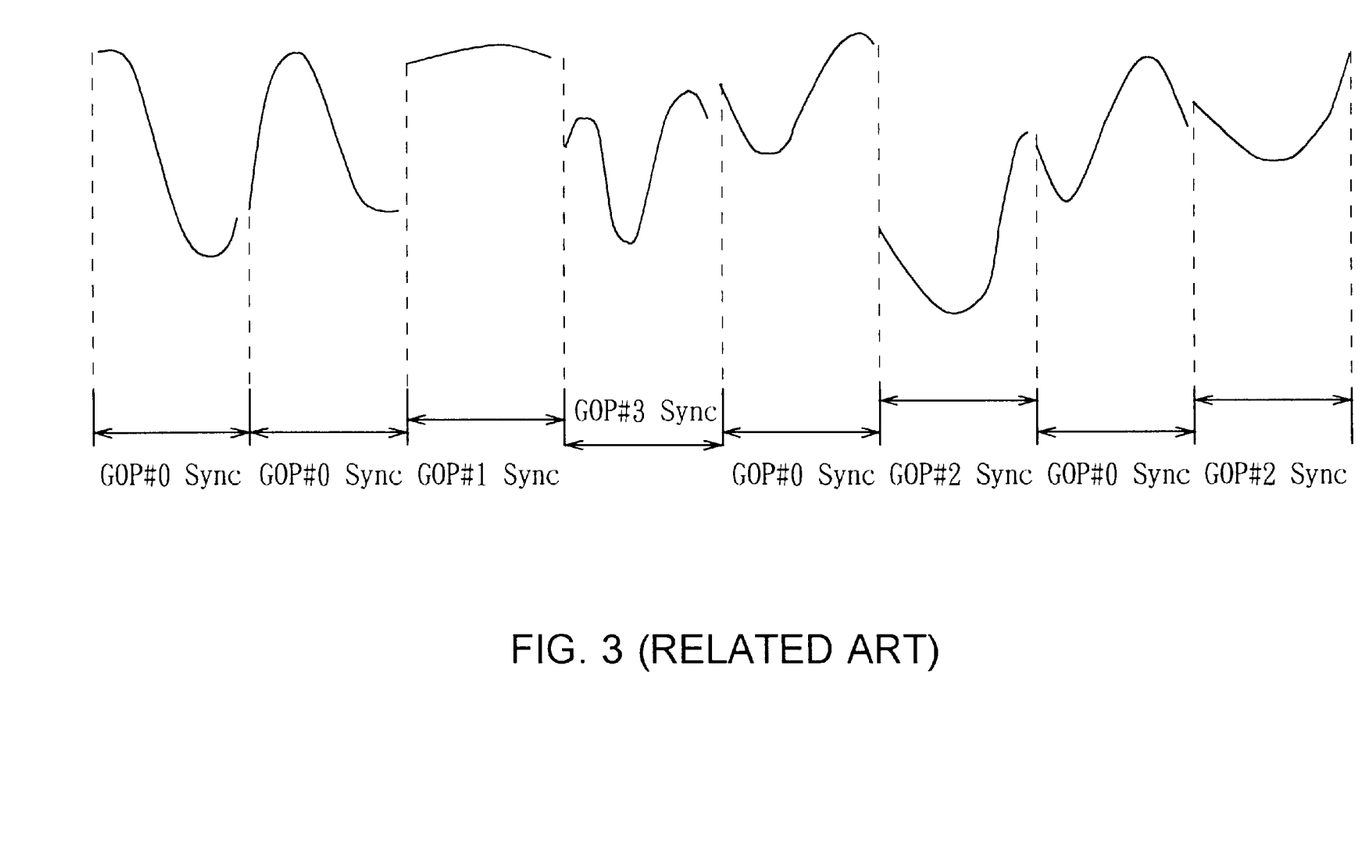
FIG. 3 is a waveform diagram illustrating a waveform of the audio-output at the time of the shuttle mode.

Therefore, in a VCR of this kind, there has been such a problem that discontinuity points occur on the joints of the data blocks of the different GOPs as shown in FIG. 3 with respect to the waveform of the audio signal at the time of, for instance, the shuttle mode; as a result, a noise occurs in the emitted audio at each discontinuity point.

There is such a problem that the more the reproducing speed becomes high the more such noises occur, and, in the worst case, a discontinuity point in the audio signal occurs for each data block, so that noises continue.

SUMMARY OF THE INVENTION

In view of the foregoing, an object of the present invention is to provide a recording/reproducing device and its method and a reproducing device and its method capable of alleviating the noises which occur in the audio output at the time of the variable speed reproducing mode.

To achieve the foregoing object and other objects of the invention, in the first plan, in the recording/reproducing device, the reproducing system has been provided with a holding and interpolating means for respectively detecting the identification codes of the respective reproduced data blocks which are supplied sequentially, inferring the most frequent identification code for each stated period from the result of the detection, holding the data value of the audio data of the immediately preceding data block and sending out it when the identification code of the data block supplied is other than the most frequent identification code, and performing the stated interpolation process when the audio data supplied transfers to the succeeding audio data of the data block of the most frequent identification code.

Besides, in the second plan, in the recording/reproducing method, a step has been provided of respectively detecting the identification codes of the respective reproduced data blocks, inferring the most frequent identification code for each stated period from the result of the detection, holding the data value of the audio data of the immediately preceding data block and sending out it when the identification code of the data block supplied is other than the most frequent identification code, and performing the stated interpolation process when the audio data supplied transfers to the succeeding audio data of the data block of the most frequent identification code.

Moreover, in the third plan, the reproducing device has been provided with a holding and interpolating means for respectively detecting the identification codes of the respective reproduced data blocks which are supplied sequentially, inferring the most frequent identification code for each stated period from the result of the detection, holding the data value of the audio data of the immediately preceding data block and sending out it when the identification code of the data block supplied is other than the most frequent identification code, and performing the stated interpolation process when the audio data supplied transfers to the succeeding audio data of the data block of the most frequent identification code.

Moreover, in the fourth plan, the reproducing method includes a step of respectively detecting the identification codes of the respective reproduced data blocks, inferring the most frequent identification code for each stated period from the result of the detection, holding the data value of the audio data of the immediately preceding data block and sending out it when the identification code of the data block supplied is other than the most frequent identification code, and performing the stated interpolation process when the audio data supplied transfers to the succeeding audio data of the data block of the most frequent identification code.

As a result, in the first–the fourth plans, it is able to send out only audio data of the data block having the identification code which is to be reproduced, without occurring of discontinuity point, even the case where the audio data of the different identification codes have been sequentially reproduced from the magnetic tape treating a data block as a unit, at the time of variable speed reproducing mode.

The nature, principle and utility of the invention will become more apparent from the following detailed description when read in conjunction with the accompanying in which like parts are designated by like reference numerals or characters.

DETAILED DESCRIPTION OF THE EMBODIMENT

Preferred embodiment of the present invention will be described with reference to the accompanying drawings:

(1) General Constitution of VCR according to the Embodiment

Figure 4:
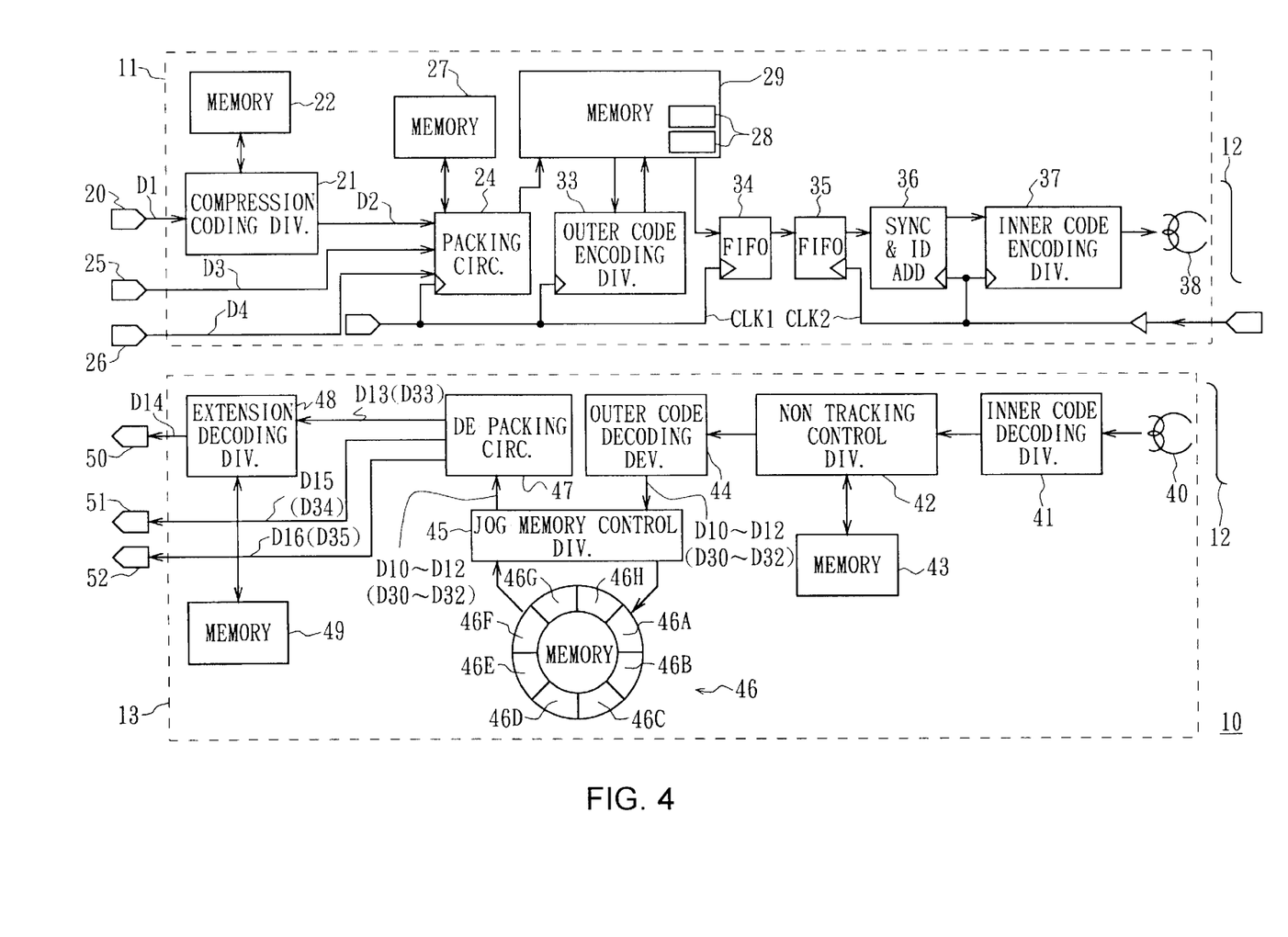
FIG. 4 is a block diagram illustrating the whole constitution of a VCR according to an embodiment.

Referring to FIG. 4, 10 generally shows a VCR according to the embodiment. The VCR 10 records the supplied video data and audio data on a magnetic tape 12 by a recording system 11 with the stated format, at the time of recording mode, and reproduces the video data and the audio data which have been recorded on the magnetic tape 12 by a reproducing system 13 and sends out them, at the time of reproducing mode and shuttle mode.

That is, in the VCR 10, video data D1 which is supplied to a video-input terminal 20 is sent to a compression-coding division 21, in the recording system 11.

The compression coding division 21 performs compression-coding of the supplied video data D1 into the stated length for each GOP, treating that which is corresponding to two frames as one GOP, with the stated compression-coding scheme (e.g., a moving picture experts group (MPEG) scheme) by the use of a memory 22, and then sequentially sends thus obtained video coded data D2 to a packing circuit 24 of an error correcting code (ECC) encoding division 23.

The packing circuit 24 respectively and sequentially equalizes the lengths of the video coded data D2 supplied from the compression coding division 21, audio data D3 delivered to an audio-input terminal 25, and system data D4 delivered to a system-data-input terminal 26 into the stated length (108 bytes, in the embodiment) by the use of a memory circuit 27, and then respectively and sequentially stores the data of thus obtained respective data blocks (hereinafter, these are referred to as synchronous blocks) 28 in the storage area which is corresponding to the video data area of an ECC block 30 shown in FIG. 5A, the storage area which is corresponding to the audio data area of an ECC block 31 shown in FIG. 5B, and the storage area which is corresponding to the first and the second frame data areas of an ECC block 32 shown in FIG. 5C in an external memory 29.

Figure 5A:
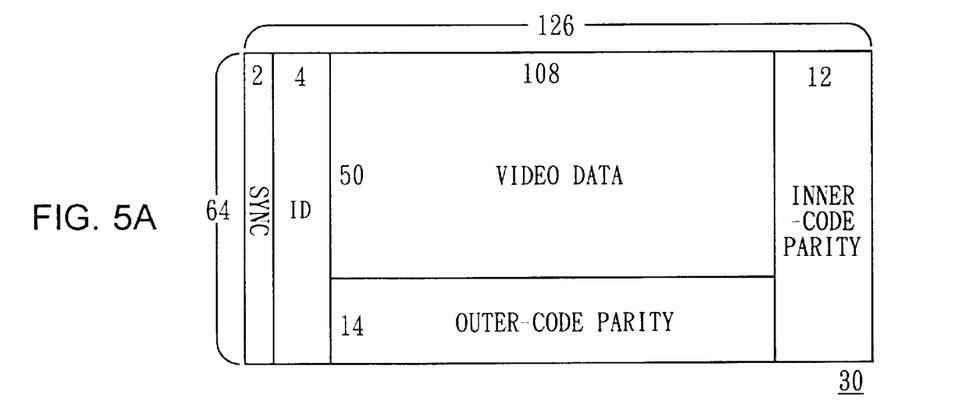
FIGS. 5A to 5C are schematic diagrams explaining the ECC block.

The ECC block 30 of FIG. 5A is composed in such a manner that the stated number (50 pieces, in FIG. 5A) of synchronous blocks 28 of the video coded data D2 are treated as a mass, and, as described herein below, to these synchronous blocks 28, the stated number (14 pieces, in FIG. 5A) of synchronous blocks 28 of the outer-code parity are added, and 2-byte synchronous code, 4-byte identification code (ID), and 12-byte inner-code parity are respectively added to these synchronous blocks 28.

In this case, thirty-six pieces of the ECC block 30 are formed from the video coded data D2 of the quantity corresponding to 625 scanning-lines and 50 fields, and thirty pieces of ECC blocks 30 are formed from the video coded data D2 of the quantity corresponding to 525 scanning-lines and 60 fields. Therefore, the storage area corresponding to the video data area of thirty-six or thirty ECC blocks 30 is provided in the external memory 29, and the video coded data D2 are respectively shuffled, treating the synchronous block 28 as a unit, and stored in the storage area corresponding to the video data area of any ECC block 30 in the external memory 29.

Figure 5B:
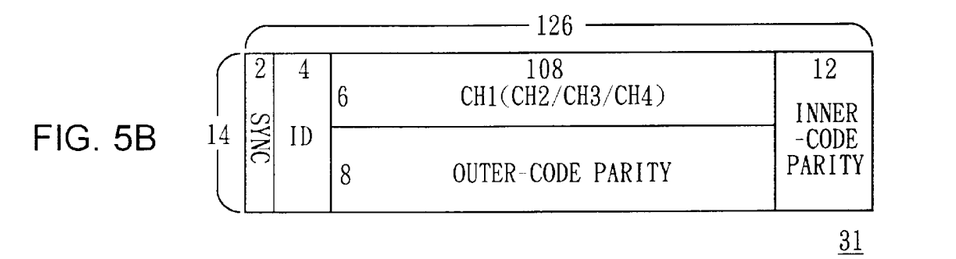

Similarly, the ECC block 31 shown in FIG. 5B is composed in such a manner that the stated number (6 pieces, in FIG. 5B) of synchronous blocks 28 of the audio data D3 are treated as a mass, and, as described herein below, to these synchronous blocks 28, the stated number (8 pieces, in FIG. 5B) of synchronous blocks 28 of the outer-code parity are added, and 2-byte synchronous code, 4-byte ID, and 12-byte inner-code parity are respectively added to each synchronous blocks 28.

This ECC block 31 is formed by 12 pieces for each channel from the audio data D3 of the quantity corresponding to 625 scanning-lines and 50 fields, and formed by 10 pieces for each channel from the audio data D3 of the quantity corresponding to 525 scanning-lines and 60 fields. Therefore, the storage area which corresponds to the audio data area of 12 pieces or 10 pieces of ECC block 31 is provided in the external memory 29, and the audio data D3 are shuffled such that the synchronous block 28 are treated as a unit, and stored in the storage area which corresponds to the audio data area of each ECC block 31 in the external memory 12. In this connection, in the VCR 10 of the embodiment, it is supposed that the audio data D3 of the quantity corresponding to four channels is supplied to the audio-input terminal 25.

Figure 5C:
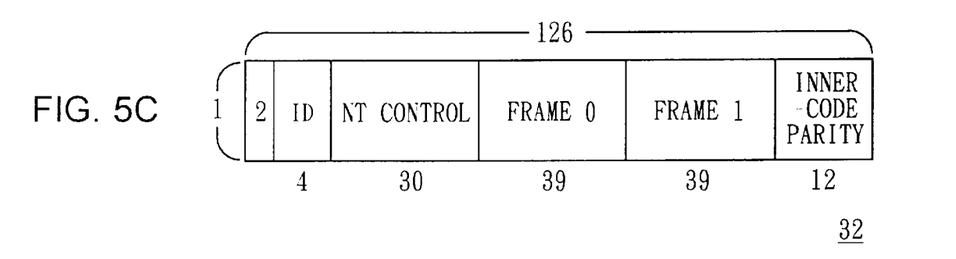

Moreover, the ECC block 32 shown in FIG. 5C is composed by adding 2-byte synchronous code, 4-byte ID, and 12-byte inner-code parity to the synchronous block 28 of the system data D4 as described herein below, and formed one piece to each GOP. Therefore, a storage area which corresponds to the system data area of one piece of ECC block 32 is provided in the external memory 29, and the system data D4 is stored in this storage area. In this connection, in the NT control data area of the ECC block 32, the ID for each GOP for non-tracking control (hereinafter, this is referred to as a GOP·ID), etc. are stored as described herein below, and in the first and the second frame data areas, various information of each frame which have been supplied as the system data D4 are stored.

An outer-code encode division 33 (FIG. 4) reads the respective data of each synchronous block 28 of the video coded data D2 or the audio data D3 which have been stored in the external memory 29, treating the ECC block as a unit, and generates the above-mentioned outer-code parity, and then, stores this in the corresponding storage area in the external memory 29 along with the corresponding video coded data D2 and audio data D3.

Then, the video coded data D2, the audio data D3, the system data D4, and the outer-code parity which have been stored in the external memory 29 are sequentially read out such that a synchronous block is treated as a unit, and modulated into the recording frequency through the first First-In First-Out (FIFO) 34 which is driven with the system clock CLK1 in the VCR 10 and the second FIFO 35 which is driven with the recording clock CLK2 in sequence, and then supplied to a synchronous-code and ID adding circuit 36.

The synchronous-code and ID adding circuit 36 adds various ID (4 bytes) such as the GOP·ID and the synchronous code (2 bytes) to the respective heads of the synchronous blocks 28 which are sequentially supplied, and then sequentially delivers these to an inner-code encoding division 37. At this time, the synchronous-code and ID adding circuit 36 stores the GOP·ID of the GOP and the GOP·IDs of the preceding and succeeding GOPs in the NT control data area of the synchronous block 28 of the system data D4.

The inner-code encoding division 37 respectively generates the above-mentioned inner-code parity, with respect to the respective synchronous blocks 28 to which the synchronous code and the ID have been added, and then adds them and outputs.

The respective synchronous blocks 28 which have been fetched from the inner-code encoding division 37 are then exposed to the stated processing at a signal processing division (not shown), and then azimuth recording of them on the magnetic tape 12 is sequentially performed through a recording head 38.

Figure 6:
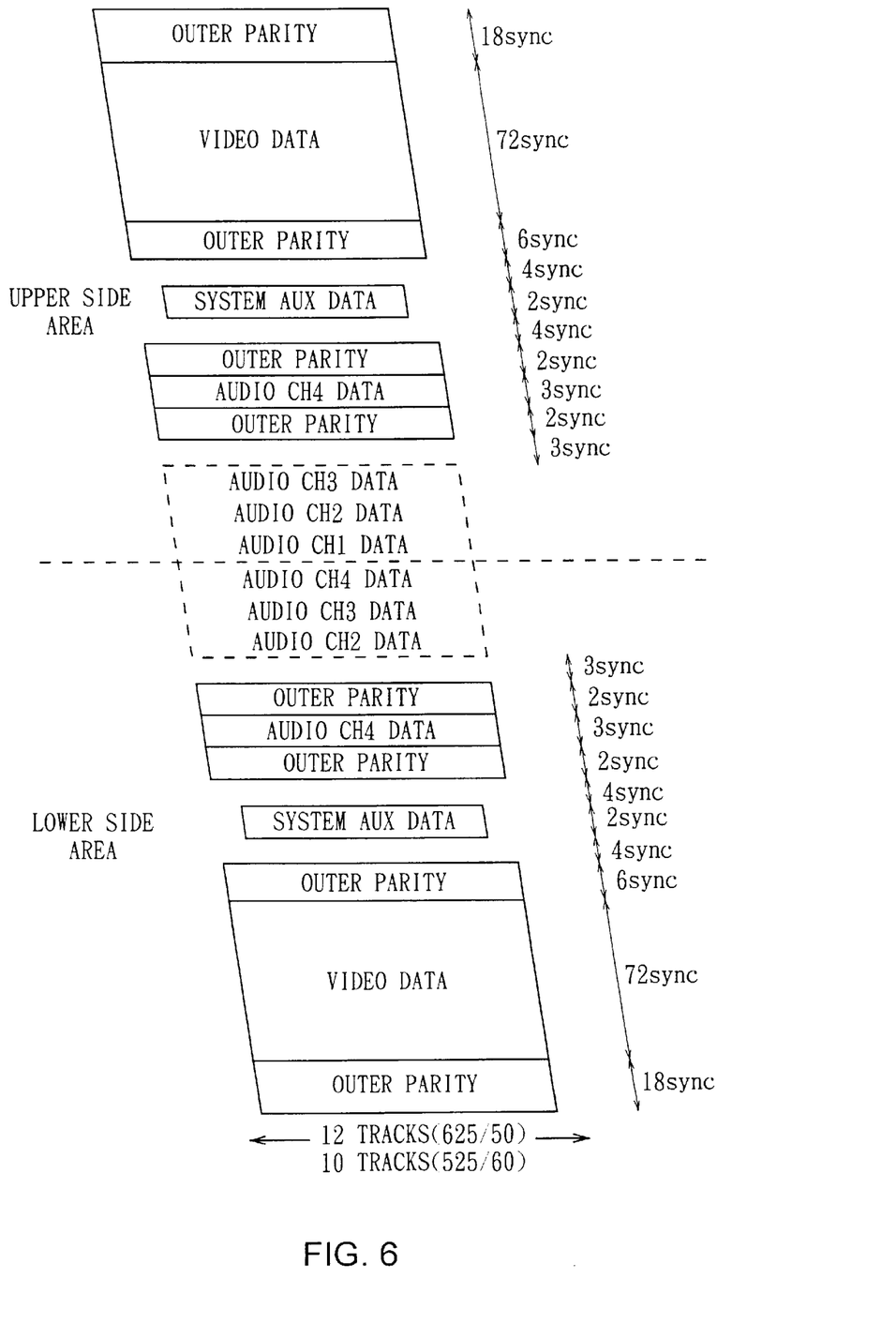
FIG. 6 is a schematic diagram explaining the recording format of 1 GOP related to the magnetic tape.

In this connection, the recording format of the VCR 10 with respect to the magnetic tape 12 is shown in FIG. 6.

As known from this FIG. 6, the video coded data D2, the audio data D3 and the system data D4 which correspond to one GOP are recorded in twelve recording tracks in the case of 625 scanning lines and 50 fields system, while ten recording tracks in the case of 525 scanning lines and 60 fields system. In each recording track, a video data area in which the video coded data D2 is recorded, an audio data area in which the audio data D3 is recorded, and a system data area in which the system data D4 is recorded are respectively provided, and the video coded data D2, the audio data D3, and the system data D4 are respectively recorded such that they are distributed to two areas as shown in FIG. 6.

Figure 7:
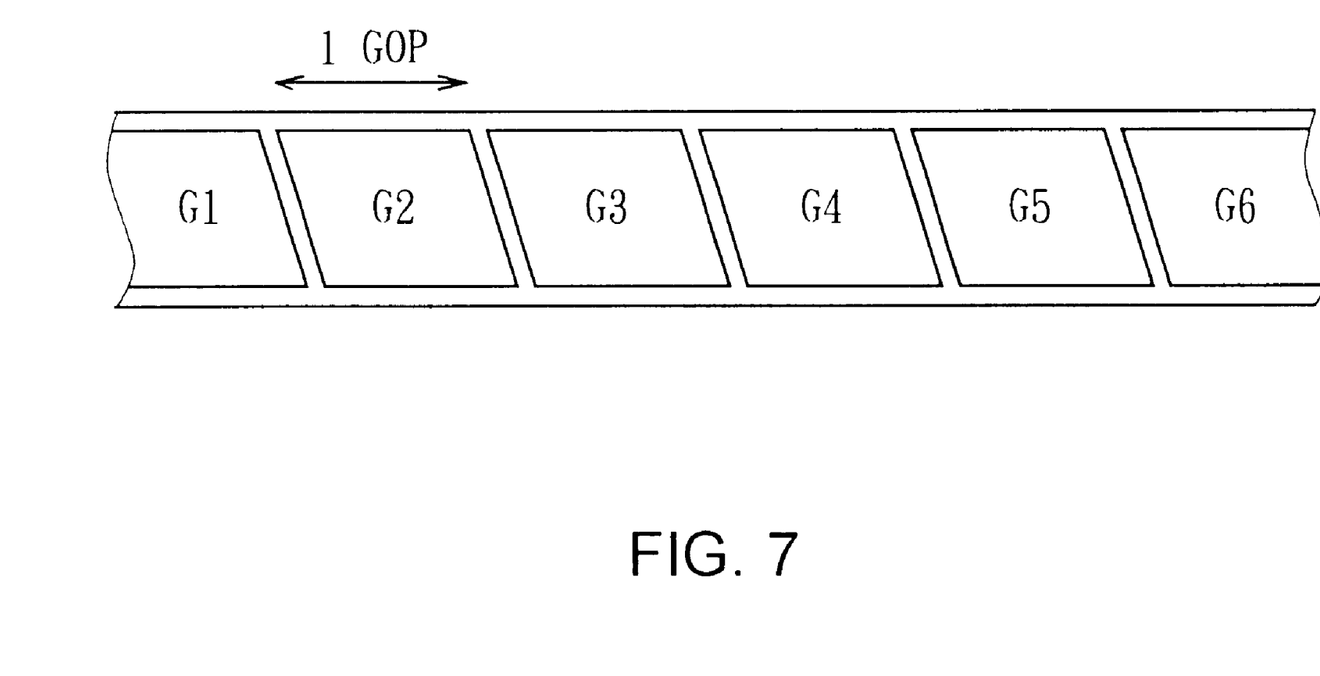
FIG. 7 is a schematic diagram showing an aspect of recording the data on the magnetic tape for each GOP.

In the VCR 10, a series of the video coded data D2 and the audio data D3 are recorded in such a manner that the video coded data D2, the audio data D3 and the system data D4 of one GOP are thus recorded in twelve recording tracks or ten recording tracks respectively and then the video coded data D2, the audio data D3 and the system data D4 of the succeeding GOP are sequentially recorded in a longitudinal direction of the magnetic tape 12. This aspect is shown in FIG. 7.

On the other hand, in the reproducing system 13, eight pieces of reproducing heads 40 (sixteen pieces, at the time of shuttle mode) sequentially reproduces the video coded data D2, the audio data D3, the system data D4, the outer-code parity, etc. which have been recorded on the magnetic tape 12, treating the synchronous block as a unit, and then sequentially sends these to an inner-code decoding division 41.

The inner-code decoding division 41 exposes the data of the reproduced each synchronous block 28 which is supplied to error correcting process, by the use of the inner-code parity added to each synchronous block 28, and then, upon removing the inner-code parity, sends the data of each synchronous block 28 error-corrected to a non-tracking control division 42.

On the basis of the GOP·ID added to each synchronous block 28 supplied, the non-tracking control division 42 removes the synchronous code and the ID from the data of each synchronous block 28 of the GOP which is to be reproduced, and stores it in a memory circuit 43 selectively and sequentially. At this time, the non-tracking control division 42 selects the data of the synchronous block 28 which do not have any error, and stores it in the memory circuit 43, when the data of the same synchronous block 28 reproduced by a reproducing head 40 exist.

The data of each synchronous block 28 stored in the memory circuit 43 is read by the non-tracking control division 42 such that each ECC block is treated as a unit, and sent to an outer-code decoding division 44.

In the outer-code decoding division 44, error correction is performed using the outer-code parity, with respect to the supplied video coded data and audio data of synchronous-block units, and then thus obtained video coded data D10 and audio data D11 of synchronous-block units are stored in each storage area 46A–46H of a jog memory division 46, via a jog memory control division 45. In this connection, the outer-code parity is resigned at this time.

The outer-code decoding division 44 do not perform outer-code correction with respect to the system data which is supplied in units of synchronous block, and enters this in each storage area 46A–46H of the jog memory division 46 as the system data D12, via the jog memory control division 45. Therefore, in each storage area 46A–46H of the jog memory division 46, the video coded data D10, the audio data D11 and the system data D12 which correspond to one GOP are stored respectively.

In accordance with the specified operation mode (reproducing mode or shuttle mode, usually), the jog memory control division 45 reads the video coded data D10, the audio data D11 and the system data D12 which correspond to one GOP and which have been respectively stored in each storage area 46A–46H of the jog memory division 46, in order of GOP or selectively, and then sequentially sends this to a depacking circuit 47 in units of synchronous block.

The depacking circuit 47 separates the supplied video coded data D10, the audio data D11 and the system data D12 of units of synchronous block respectively, performs extension decoding of the obtained video coded data D13 of the original frequency by the use of a memory circuit 49 in an extension decoding division 48, and then delivers this to the exterior via a video-data-output terminal 50, as a reproduced video data D14.

Besides, the depacking circuit 47 sends out the obtained audio data D15 and the system data D16 of the original frequency to the exterior, via an audio-output terminal 51 and a system-data-output terminal 52 respectively.

In this way, in the VCR 10, the supplied video data D1 and the audio data D2 are recorded on the magnetic tape 12, and the video coded data D2 and the audio data D3 recorded on the magnetic tape 12 are reproduced and sent to the exterior.

(2) Detailed Constitution of Reproducing System

Figure 8:
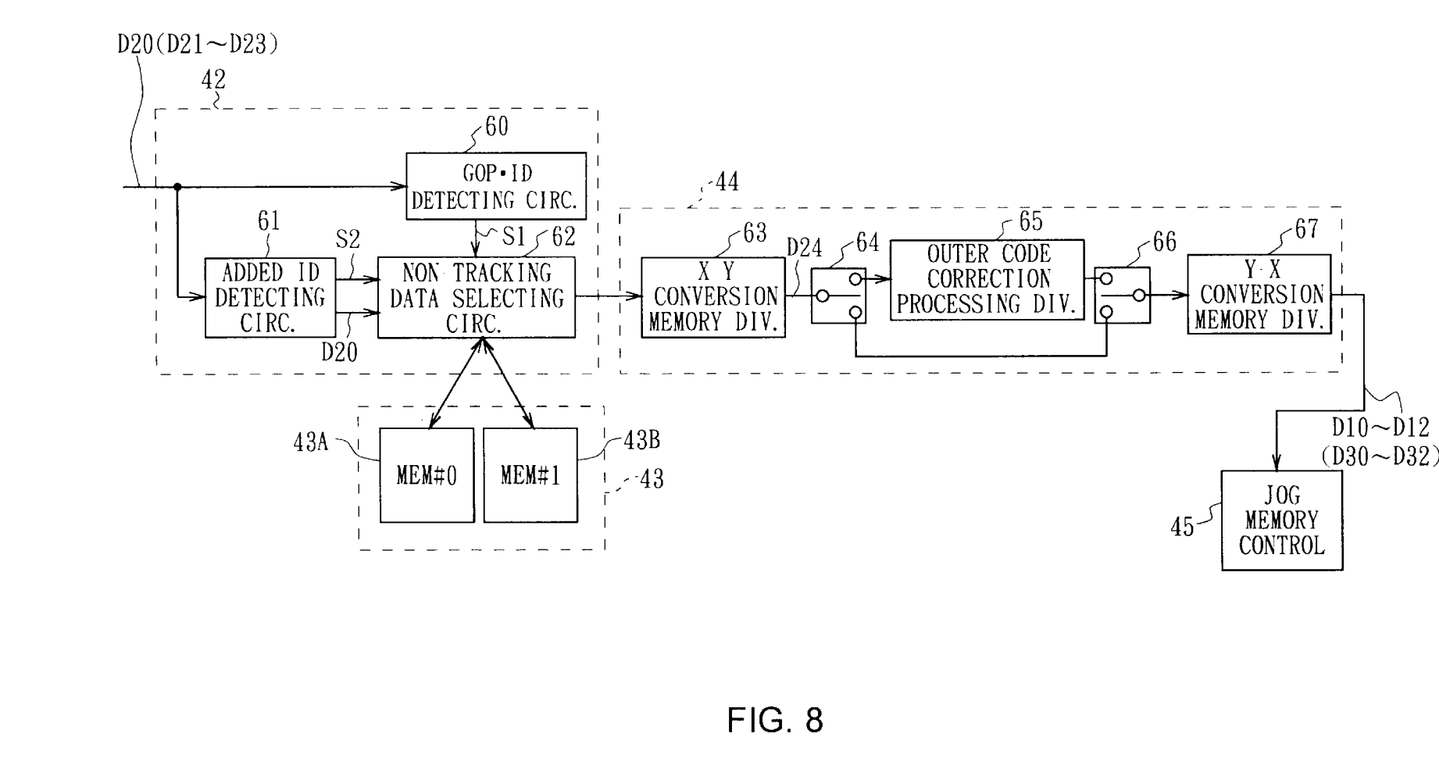
FIG. 8 is a block diagram illustrating the constitution of the non-tracking control division and the outer-code encoding division.
Figure 9:
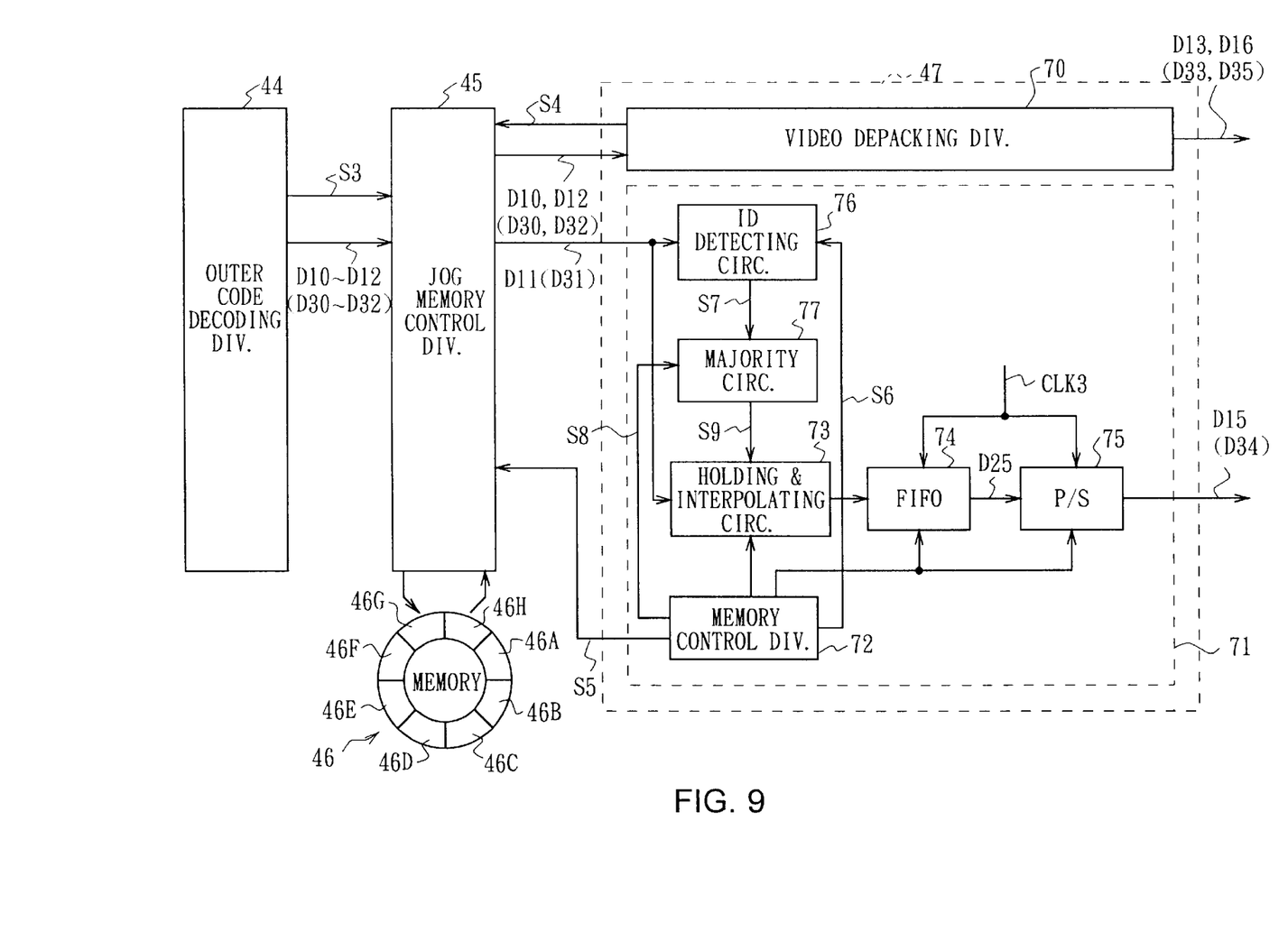
FIG. 9 is a block diagram illustrating the constitution of the depacking division.

In fact, the non-tracking control division 42 and the outer-code encoding division 44 of the reproducing system 13 are composed as shown in FIG. 8, and the depacking division 47 is composed as shown in FIG. 9.

In this case, the operations of the non-tracking control division 42, the outer-code encoding division 44 and the depacking division 47 differ between the time of ordinary reproduction mode and the time of shuttle mode; so, in the following description, the constitutions of these non-tracking control division 42, the outer-code encoding division 44 and the depacking division 47 are described such that the time of ordinary reproduction mode and the time of shuttle mode are discriminated.

First, at the time of ordinary reproduction mode, in the non-tracking control division 42, the data D20 (the video coded data D21, the audio data D22, the system data D23, the outer-code parity, etc.) of each synchronous block 28 which has been exposed to inner-code correction and supplied from the inner-code decoding division 41 are sent to a GOP·ID detecting circuit 60 and an added ID detecting circuit 61.

The GOP·ID detecting circuit 60 detects the GOP·ID of the very GOP which has been stored in the NT control area of the synchronous block 28 of the system data D23 out of the supplied each synchronous block 28, and sends the result of the detection to a non-tracking data selecting circuit 62 as a GOP·ID detection signal S1.

On the other hand, the added ID detecting circuit 61 detects the GOP·ID which has been added to each synchronous block 28, and sends the detection result to the non-tracking data selecting circuit 62 as an additional ID detection signal S2, along with the data D20 of each synchronous block 28.

In the non-tracking data selecting circuit 62, the data of each synchronous block of the same GOP are distributed and stored to the same storage areas 43A and 43B of the memory circuit 43, on the basis of the GOP·ID supplied from the GOP·ID detecting circuit 60 of the GOP to be reproduced, and the GOP·ID added to each synchronous block 28 and supplied from the added ID detecting circuit 62.

At this time, the non-tracking data selecting circuit 62 stores the data D20 of each synchronous block 28 in the corresponding storage areas 43A and 43B of the memory circuit 43 as stated above, so as to reconfigure the respective ECC blocks 30, 31 and 32, and to select the data D20 of the synchronous block 28 which do not include any error when the same synchronous block 28 reproduced by the reproducing head 40 exists.

Then, on such a stage that the data D20 of each synchronous block 28 corresponding to one GOP has been stored in one side of the storage areas 43A and 43B of the memory circuit 43, the non-tracking data selecting circuit 62 sequentially reads the data D20 of each synchronous block 28 from the storage area 43A, 43B, and sends the video coded data D21, the reproductive audio data D22, the system data D23, and the outer-code parity to the outer-code encoding division 44 in units of synchronous block.

As to the outer-code decoding division 44, lateral and vertical data arrangement is converted in units of ECC block, in a X-Y conversion memory division 63, with respect to the data D20 of each synchronous block 28 supplied from the non-tracking data selecting circuit 62, and then the converted data D24 of the respective ECC blocks 30 and 31 which have been thus obtained are sent to an outer-code correction processing division 65, via a change-over circuit 64.

In the outer-code correction processing division 65, error correction process toward the converted data D24 of the respective ECC blocks 30 and 31 supplied is performed by the use of the added outer-code parity, and then the lateral and vertical data arrangement of this is converted in units of ECC block, in a Y-X conversion memory division 67. In this connection, at this time, the outer-code correction processing division 65 sends out the data except the outer-code parity to the Y-X conversion memory division 67. Therefore, the video coded data D10 and the audio data D11 of which outer-code correction have been performed, and the system data D12 of which outer-code correction has not been performed are sent from the Y-X conversion memory division 67.

The video coded data D10, the audio data D11 and the system data D12, of units of synchronous block, which have been sent from the Y-X conversion memory division 67 are stored in the corresponding storage area 46A–46H of the jog memory 46, in units of GOP and in such a state that they have been grouped into the ECC block 30, 31 and 32, via the jog memory control division 45, as stated above.

As to the video coded data D10, the audio data D11 and the system data D12, of units of GOP, which have been stored in each storage area 46A–46H of the jog memory 46, after this, the video coded data D10 and the system data D12 are read by a video depacking division 70 of the depacking division 47 shown in FIG. 9 at the stated timing, and the audio data D11 is read by an audio depacking division 71 at the stated timing.

That is, at the time of ordinary reproduction mode, the video depacking division 70 sends a read signal S4 toward the jog memory control circuit 45 with the stated period, so as to cause it to sequentially read, in units of the synchronous block, the video coded data D10 and the system data D12 which correspond to one GOP and which have been stored in each storage area 46A–46H of the jog memory 46 with the stated period.

Besides, the video depacking division 70 modulates the reproduced video coded data D10 and the system data D12 which have been read out into the original frequency respectively, and then sends to the extension decoding division 48 as the above-mentioned video coded data D13 or the system data D16. As a result, the video coded data D10 is decoded in the extension decoding division 48 as stated above, and then the decoded reproductive video data D14 which has been thus obtained is supplied to the exterior via the video-output terminal 50.

On the other hand, in the audio depacking division 71, at the time of ordinary reproduction mode, a memory control division 72 which is comprised of a timing generator sends a read signal S5 to the jog memory control division 45 with the stated period to cause it to sequentially read, in units of the synchronous block, the audio data D11 which corresponds to one GOP and which has been stored in each storage area 46A–46H of the jog memory 46 with the stated period, and then supplies these to an interpolating circuit 73 sequentially.

At this time, the interpolating circuit 73 sends the untouched data of supplied each synchronous block 28 to a FIFO 74, without performing any processing of it.

The FIFO 74 sequentially stores the audio data D11 supplied, reads the stored audio data D11 for each 1 sampling data with the original sampling frequency, on the basis of the timing clock CLK3 which is supplied from a timing generator (not shown), and sends this data to a parallel-serial conversion circuit 75 as the audio data D25.

The parallel-serial conversion circuit 75 performs serial-conversion of the supplied audio data D25, and then sends this to the audio-output terminal 51 as the above-mentioned reproductive audio data D15, as stated above. In this way, at the time of ordinary reproduction mode, the reproduction system performs decoding and demodulating of the video coded data D2 and the audio data D3 which have been reproduced from the magnetic tape 12, and then supplies them to the exterior via the video-output terminal 50 or the audio-output terminal 51.

On the other hand, at the time of shuttle mode, toward the data D20 of each synchronous block 28 supplied from the inner-code encoding division 41, the added ID detecting circuit 61 of the non-tracking control division 42 do not perform any processing with respect to the video coded data D21 and the system data D23 and sends them as they are to the non-tracking data selecting circuit 62, while, with respect to the audio data D22, it detects the GOP·ID which has been added to the head of the synchronous block 28, writes this in the low-order several bits of the synchronous block 28, and then sends these data of each synchronous block 28 to the non-tracking data selecting circuit 62.

The non-tracking data selecting circuit 62 sequentially stores the data D20 of each synchronous block 28 supplied from the added ID detecting circuit 61 in one storage area 43A, 43B of the memory circuit 43. At this time, the data of plural GOPs are mixed in the output of the added ID detecting circuit 61 in the case where the reproduction speed is high, however the non-tracking data selecting circuit 62 sequentially stores the video coded data D21, the audio data D22 and the system data D23 which are supplied within one GOP time in the memory circuit 43 so as to construct the ECC blocks 30, 31, 32, ignoring the differences of GOP.

Besides, the non-tracking data selecting circuit 62 then sequentially reads the video coded data D21, the audio data D22 and the system data D23 of the quantity of one GOP, which have been stored in the memory circuit 43, with the stated timing in units of synchronous block, and then sequentially sends these to the outer-code encoding division 44.

Without performing of outer-code correction with respect to the data of each synchronous block 28 supplied from the non-tracking data selecting circuit 62, the outer-code encoding division 44 sends these data of each synchronous block 28 to the jog memory control circuit 45, via the X-Y conversion memory division 63, the switch circuit 64, the switch circuit 66, and the Y-X conversion memory division 67 in order, and then sequentially stores these in the corresponding storage area 46A–46H of the jog memory division 46, in such a state that they are grouped into the ECC blocks 30, 31, 32.

Then, the video coded data D30, the audio data D31, and the system data D32 which have been stored in each storage area 46A–46H of the jog memory 46 are read in the same way as of the time of ordinary reproduction mode, and the video coded data D30 and the system data D32 are respectively supplied to the video depacking division 70 of the depacking division 47 shown in FIG. 9, while the audio data D31 is supplied to the audio depacking division 71.

In this case, the video depacking division 70 processes the video coded data D30 and the system data D32 which are supplied in the same way as of the time of ordinary reproduction mode, decodes the obtained video coded data D33 in the extension decoding division 48, and then outputs them to the exterior via the video-output terminal 50. Besides, the video depacking division 70 sends out the obtained system data D35 to the exterior, via the system-data-output terminal 52.

On the other hand, in the audio depacking division 71, at the time of shuttle mode, the supplied audio data D31 is sent to an ID detecting division 76 and the holding and interpolating circuit 73.

At this time, the ID detecting division 76 detects the GOP·ID of the synchronous block 28 which has been written in the low-order several bits of each synchronous block 28 of the sequentially supplied audio data D31, on the basis of a timing signal S6 which represents the timing of the head of each synchronous block 28 supplied from the memory control division 72, and sends the result of the detection to a majority circuit 77 as an ID detection signal S7.

In the majority circuit 77, on the basis of the ID detection signal S7 supplied from the ID detecting division 76 and a timing signal S8 which represents the head of each GOP and which is supplied from the memory control division 72, the GOP·ID which will appear most frequently in the future (this is referred to as a most frequent GOP·ID, hereinafter) is inferred, for each GOP, from the GOP·IDs which have been detected during the process of detecting from the leading synchronous block 28 until the stated numberth synchronous block 28, and then a control signal S9 which is based on the result of the inference is sent to the holding and interpolating circuit 73.

Figure 10:
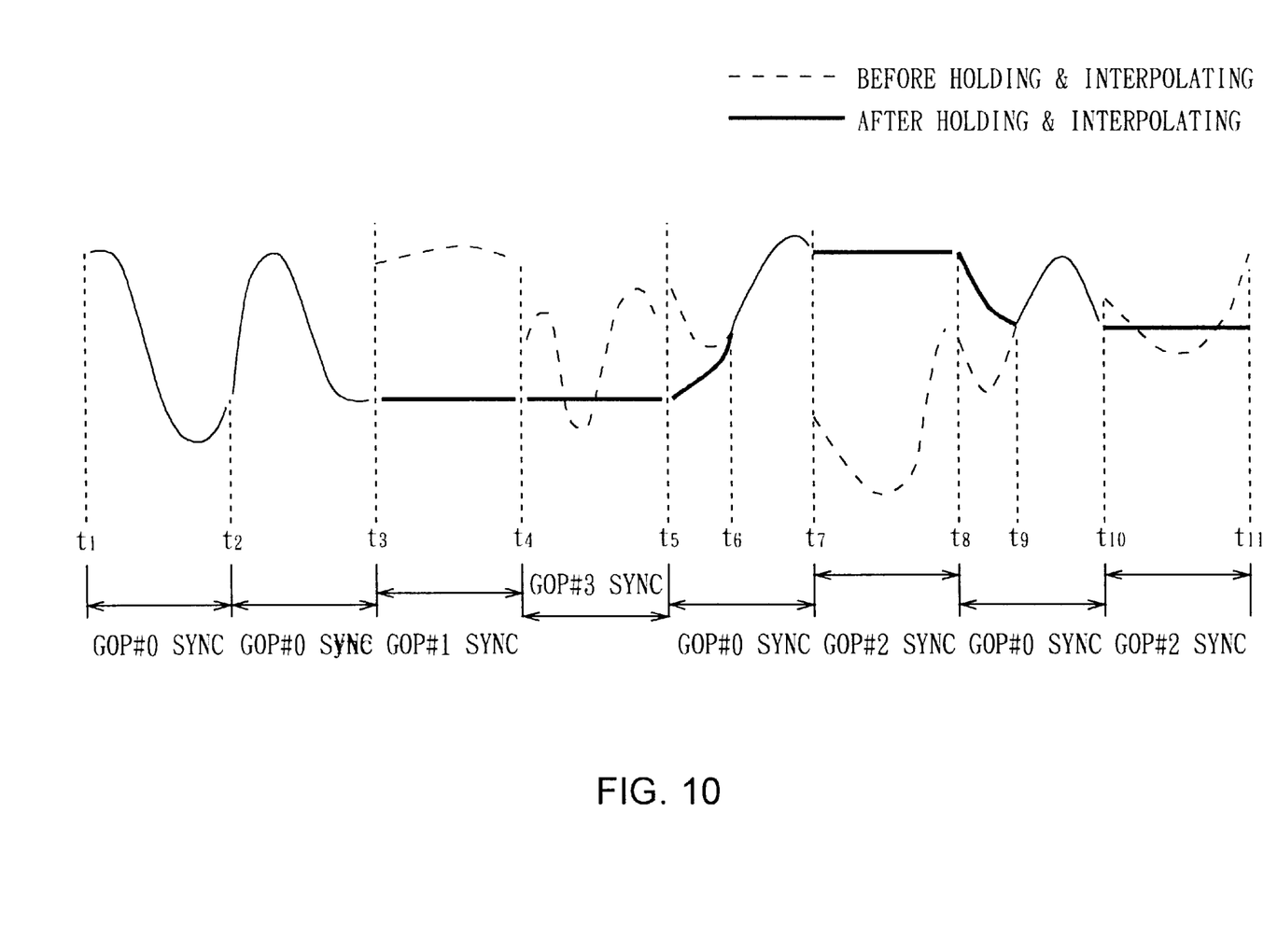
FIG. 10 is a wave-form diagram illustrating a waveform of the audio-output which has been held and interpolated.

When a synchronous block 28 whose GOP·ID is the most frequent GOP·ID (this is referred to as an effective synchronous block, hereinafter) has been supplied, the holding and interpolating circuit 73 sends the untouched data of the very synchronous block 28 to the FIFO 74 without performing any processing of it, as shown in the time $t_1$–$t_3$ of FIG. 10, on the basis of the control signal S9 supplied from the majority circuit 77.

In contrast with this, in the case where a synchronous block 28 whose GOP·ID is not the most frequent GOP·ID (this is referred to as an invalid synchronous block, hereinafter) has been supplied, the holding and interpolating circuit 73 holds the last data value of the immediately preceding synchronous block 28 and then sends out the very data value in place of the data of the invalid synchronous block 28 as shown in the time $t_3$–$t_5$, $t_7$–$t_8$, and $t_{10}$–$t_{11}$ of FIG. 10; after that, when the effective synchronous block 28 has been supplied, the circuit 73 discards the data of the several samples from the head of the very effective synchronous block 28, performs interpolation process of the data such that the wave form is smoothly tied from the above-mentioned held data value till the data of the stated numberth sample of the very synchronous block 28 as shown in the time $t_5$–$t_6$, $t_8$–$t_9$ of FIG. 10, and then supplies the data of the very effective synchronous block to the FIFO 74.

Until the inference of the most frequent GOP·ID has been performed by the majority circuit 77, the holding and interpolating circuit 73 performs the above-mentioned interpolation processing with respect to the data of the supplied all synchronous blocks 28, and sends the obtained data to the FIFO 74 sequentially, on the basis of the control signal S9 supplied from the majority circuit 77.

The FIFO 74 demodulates the respective data of the respective synchronous blocks 28 which are sequentially supplied in the same way as of the ordinary reproduction mode, exposes the demodulated data to serial conversion at the parallel-serial conversion circuit 75, and then sends the obtained series of audio data D34 to the audio-output terminal 51 as stated above.

In the reproduction system 13, at the time of shuttle mode, interpolation is sequentially performed in this way with respect to the discontinuity points of the audio data D31 which has been reproduced from the magnetic tape 12, so that the data is demodulated and then sent out to the exterior from the audio-output terminal 51.

(3) Operation and Advantages of the Embodiment

On the above constitution, in this VCR 10, at the time of shuttle mode, inner-code correction is performed in the inner-code encoding division, with respect to each synchronous block 28 of the audio data D3 which has been reproduced from the magnetic tape 12, and then the GOP·ID of the very synchronous block 28 is written in the low-order several bits, in the ID detecting circuit 61 of the non-tracking control division 42 (FIG. 8), and then this is stored in the corresponding storage area 46A–46H, via the jog memory control division 45.

Next, these audio data D31 which have been stored in the storage areas 46A–46H of the jog memory 46 are selectively read via the jog memory control division 45, and sent to the ID detecting circuit 76 and the holding and interpolating circuit 73 of the audio depacking division 72 of the depacking division 47.

Besides, the GOP·ID of each synchronous block 28 of the audio data D31 is detected in the ID detecting circuit 76, and, on the basis of the result of the detection, the most frequent GOP·ID is inferred in the majority circuit 77; on the basis of the result of the inference, in the case where the synchronous block 28 which has been supplied to the holding and interpolating circuit 73 is an effective synchronous block 28, its data is fetched as it is from the holding and interpolating circuit 73, while in the case of an invalid synchronous block 28, the data value of the immediately preceding synchronous block 28 is held and fetched, and, when an effective synchronous block 28 has been supplied subsequently, the data of the effective synchronous block 28 is exposed to the stated interpolation processing and then sent out.

Besides, after this, these data of the synchronous block 28 are demodulated to the original sampling frequency by the use of the FIFO 74, exposed to serial conversion in the parallel-serial conversion circuit 75, and then sent to the exterior via the audio-output terminal 51.

So, in the VCR 10, at the time of shuttle mode, in even the case where the synchronous blocks 28 which have the different GOP·IDs have been sequentially reproduced, only the data (audio data) of the synchronous block 28 of the GOP which is to be reproduced can be fetched without occurring of a discontinuity point in the waveform of the audio-output, so that generating of noise in the audio-output can be greatly alleviated, proportionately.

Besides, in the VCR 10, the GOP·ID of each synchronous block 28 of the audio data D22 is detected in the non-tracking control division 42, and sequentially written in the low-order several bits of the very synchronous block 28, so as to be transmitted to the subsequent stage.

In this case, as a method of transmitting the GOP·ID of each synchronous block 28 of the audio data D22 to the stages which succeed the non-tracking control division 42, such an approach may be suggested that each synchronous block 28, of the audio data D22, to which the GOP·ID has been added is supplied to the succeeding stages in order, as it is; however, if this approach is adopted, a preparation of the storage area for the GOP·ID of each synchronous block 28 of the audio data D22 is needed for each of the memory circuit 43 (FIG. 4), the X-Y conversion memory division 63 (FIG. 8) and the Y-X conversion memory division 67 (FIG. 8) of the outer-code encoding division 44, and the jog memory 46 (FIG. 4), and so there are such problems that the constitution is complicated and the manufacturing cost becomes high.

With respect to this point, in the low-order several bits of each synchronous block 28 of the audio data D22, the GOP·ID of the very synchronous block 28 is written, at the non-tracking control division 42 of the VCR 10, therefore, there are such advantages that the whole constitution can be simplified and the manufacturing cost can be suppressed. In this connection, at the time of the shuttle mode, even though the low-order several bits of, for instance, 16-bit audio data D22 have been missed, the tone quality scarcely differs from that of the case where the missing do not exist.

According to the above constitution, at the time of the shuttle mode, the GOP·ID of each synchronous block 28 of the audio data D22 which has been reproduced from the magnetic tape 12 is written in the low-order several bits of the data of the very synchronous block 28, and these GOP·IDs of the respective synchronous blocks 28 of the audio data D22 are detected in the subsequent stage, and the most frequent GOP·ID is inferred in the majority circuit 77 from the result of the detection; from the result of the inference, in the case where the synchronous block 28 supplied to the holding and interpolating circuit 73 is an effective synchronous block 28, its data is fetched as it is from the holding and interpolating circuit 73; while in the case of an invalid synchronous block 28, the data value of the directly preceding synchronous block 28 is held and fetched and, when an effective synchronous block 28 has been supplied subsequently, the data of the effective synchronous block 28 is exposed to the stated interpolation processing and then sent out; as a result, only the data (audio data) of the synchronous block 28 of the GOP which is to be reproduced can be fetched without occurring of discontinuity points in the waveform of the audio-output, in this way, the noise which is generated in the audio-output at the time of the variable-speed reproduction mode can be alleviated.

(4) Other Embodiments

The embodiment has dealt with the case of applying to the VCR which is adapted to treat the plural frames as a unit (GOP), and dividing the audio data D2, for each GOP, into the synchronous blocks 28 having the stated length, and recording them on the magnetic tape 12. However, the present invention is not only limited to this but also can apply to the other various recording/reproducing devices and reproducing devices such as a recording/reproducing device having a recording system for recording a series of audio data on a tape recording medium and a reproducing system for reproducing the audio data which has been recorded on the tape recording medium, and a reproducing device for reproducing the audio data from the tape recording medium in which a series of audio data has been divided into plural data blocks for each first unit, and the audio data has been recorded in units of the data block to which an identification code for each first unit has been added.

In this case, the recording system of the recording/reproducing device is preferably provided with a recording means for dividing a series of audio data into plural data blocks for each first unit (in units of GOP, in the embodiment) and for recording the data on the tape recording medium in units of the data block, adding the identification code for each first unit; and the reproducing system of the recording/reproducing device or the reproducing device is preferably provided with a reproducing means (the reproducing head 38, in the embodiment) for reproducing the audio data from the tape recording medium in units of data block and then outputting it, and a holding and interpolating means (the ID detecting circuit 76, the majority circuit 77, and the holding and interpolating circuit 73 of the depacking division 47, in the embodiment) for respectively detecting the identification codes of the respective data blocks which have been reproduced, inferring the most frequent identification code for each stated period (1 GOP period, in the embodiment) from the result of the detection, holding the audio data of the immediately preceding data block and sending out it when the identification code of the data block supplied is other than the most frequent identification code, and performing the stated interpolation process when the audio data supplied transfers to the succeeding audio data of the data block of the most frequent identification code.

Moreover, the above embodiments have dealt with the case where the added ID detecting circuit 61, which is an identification-code detecting and writing means for detecting the GOP·ID which is added to the synchronous block 28 of the reproduced audio data D3 and writing the detected GOP·ID in the very synchronous block 28, writes the detected GOP·ID in the low-order several bits of the very synchronous block 28, at the time of the shuttle mode. However, the present invention is not only limited to this case but also the detected GOP·ID may be written in the other position than the low-order several bits of the very synchronous block 28 by the added ID detecting circuit 61.

Moreover, the above embodiments have dealt with the case where, when an invalid synchronous block 28 has been fetched, the holding and interpolating circuit 73 holds the last data value of the directly preceding synchronous block 28 and sends out the very data value instead of the data of the invalid synchronous block 28, and, when an effective synchronous block 28 has been fetched afterward, the circuit 73 discards the data of the several samples from the head of the very effective synchronous block 28 and performs interpolation process of the corresponding data such that the waveform is smoothly tied from the above-mentioned held data value to the stated numberth sample data of the very synchronous block 28. However, the present invention is not only limited to this case but also such an approach may be adopted that the data of the several samples are discarded from the back part of the held data which is to be sent instead of the data of the invalid synchronous block 28, and the corresponding data is interpolated; the other various interpolating methods can be applied as the interpolating method of the holding and interpolating circuit 73.

Moreover, the above embodiments have dealt with the case where the holding and interpolating means has been placed within the depacking division 47, wherein the means respectively detects the identification codes of the respective data blocks which have been reproduced, infers the most frequent identification code for each stated period (1 GOP period, in the embodiment) from the result of the detection, holds the audio data of the immediately preceding data block and sends out it when the identification code of the supplied data block is other than the most frequent identification code, and performs the stated interpolation processing when the very sent audio data transfers to the succeeding audio data of the data block of the most frequent identification code. However, the present invention is not only limited to this case but also the means may be placed on a stage (e.g., the non-tracking control division 42) which precedes the depacking division 47.

In this case, in the case where the above-mentioned holding and interpolating means is placed within, e.g., the non-tracking control division 42, at the time of the shuttle mode, in the non-tracking data selecting circuit 62, only the data of the synchronous block 28 to which the most frequent GOP·ID has been added may be sent to the succeeding stage in the same way as the above-mentioned holding and interpolating circuit 73.

As stated above, according to the first and the second plans, at the time of recording, a series of audio data is divided into plural data blocks for each first unit of it, and recorded on a tape recording medium in units of the data block whereto an identification code for each first unit is added, on the other hand, at the time of reproduction, the identification codes of the reproduced data blocks are sequentially detected, the most frequent identification code are inferred for each stated period from the result of the detection, and, when the identification code of the data block is other than the most frequent identification code, the identification code of the immediately preceding data block is held and sent out, and the stated interpolation process is performed when the output transfers to the succeeding audio data of the data block of the most frequent identification code; so that it is able to send out only the audio data of the first unit which is to be fetched, without occurring of discontinuity point, even the case where the audio data of the different first units have been sequentially reproduced from the magnetic tape in units of data block, at the time of the variable speed reproduction mode; in this way, it is able to realize a recording/reproducing device and its method which is capable of alleviating the noise generated in the audio-output at the time of the variable speed reproduction mode.

Besides, according to the third and the fourth plans, in a reproducing device and its method for reproducing the audio data from the tape recording medium in which a series of audio data has been divided into plural data blocks for each first unit, and the audio data has been recorded in units of the data block to which an identification code for each first unit has been added, the identification codes of the reproduced data blocks are sequentially detected, the most frequent identification code are inferred for each stated period from the result of the detection, and, when the identification code of the data block is other than the most frequent identification code, the identification code of the immediately preceding data block is held and sent out, and the stated interpolation process is performed when the output transfers to the succeeding audio data of the data block of the most frequent identification code; so that it is able to send out only the audio data of the first unit which is to be fetched, without occurring of discontinuity point, even the case where the audio data of the different first units have been sequentially reproduced from the magnetic tape in units of data block, at the time of the variable speed reproduction mode; in this way, it is able to realize a reproducing device and its method which is capable of alleviating the noise generated in the audio-output at the time of the variable speed reproduction mode.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A recording/reproducing device having a recording system for recording a series of audio data on a tape recording medium, and a reproducing system for reproducing said audio data which has been recorded on said tape recording medium; wherein said recording system comprises:

a recording means for dividing said series of audio data such that each first unit of it is divided into plural data blocks, and recording it on said tape recording medium treating the data block as a unit and adding an identification code for each said first unit; and said reproducing system comprises:

a reproducing means for reproducing said audio data from said tape recording medium in such a manner that said data block is treated as a unit; and a holding and interpolating means for respectively detecting said identification codes of the respective reproduced said data blocks which are supplied sequentially, inferring the most frequent said identification code for each stated period from the result of the detection, sending out said audio data of the data block when said identification code of said data block supplied is said most frequent identification code, holding the data value of said audio data of the immediately preceding said data block and sending it when said identification code of said data block supplied is other than said most frequent identification code, and performing the stated interpolation process when said audio data supplied transfers to the succeeding said audio data of said data block of said most frequent identification code.

2. The recording/reproducing device according to claim 1, wherein said reproducing system comprises:

an identification code detecting and writing means, which is placed on a stage preceding said holding and interpolating means, for detecting said identification code which has been added to said data block of said audio data which has been reproduced from said tape recording medium, and writing the detected identification code on the stated location in the data block.

3. A recording/reproducing method for recording a series of audio data on a tape recording medium, and reproducing said series of audio data which has been recorded on said tape recording medium, said method comprising:

a first step of dividing said series of audio data such that each first unit of it is divided into plural data blocks, and recording it on said tape recording medium treating said data block as a unit and adding an identification code for each said first unit;

a second step of reproducing said audio data from said tape recording medium, treating said data block as a unit; and a third step of respectively detecting said identification codes of the respective reproduced said data blocks, inferring the most frequent said identification code for each stated period from the result of the detection, sending out said audio data of the data block when said identification code of said data block is said most frequent identification code, holding the data value of said audio data of the immediately preceding said data block and sending it when said identification code of said data block is other than said most frequent identification code, and performing the stated interpolation process when said audio data sent out transfers to the succeeding said audio data of said data block of said most frequent identification code.

4. The recording/reproducing method according to claim 3, wherein, on said second step, said identification code which has been respectively added to each said data block of said audio data which has been reproduced from said tape recording medium is detected, and the detected identification code is written on the stated location in the data block.

5. A reproducing device for reproducing audio data from a tape recording medium, wherein a series of audio data has been divided such that each first unit thereof has been divided into plural data blocks and then recorded in such a manner that said data block is treated as a unit and an identification code for each said first unit is added, said reproducing device comprising:

a reproducing means for reproducing said audio data from said tape recording medium in such a manner that said data block is treated as a unit; and a holding and interpolating means for respectively detecting said identification codes of the respective reproduced said data blocks which are supplied sequentially, inferring the most frequent said identification code for each stated period from the result of the detection, sending out said audio data of the data block when said identification code of said data block supplied is said most frequent identification code, holding the data value of said audio data of the immediately preceding said data block and sending out it when said identification code of said data block supplied is other than said most frequent identification code, and performing the stated interpolation process when said audio data sent out transfers to the succeeding said audio data of said data block of said most frequent identification code.

6. The reproducing device according to claim 5, comprising:

an identification code detecting and writing means, which is placed on a stage preceding said holding and interpolating means, for detecting said identification code which has been added to each said data block of said audio data which has been reproduced from said tape recording medium, and writing the detected identification code on the stated location in the data block.

7. A reproducing method for reproducing audio data from a tape recording medium, wherein a series of audio data has been divided such that each first unit thereof has been divided into plural data blocks, and then recorded in such a manner that said data block is treated as a unit and an identification code for each said first unit is added, said method comprising:

a first step of reproducing said audio data from said tape recording medium, treating said data block as a unit; and a second step of respectively detecting said identification codes of the respective reproduced said data blocks, inferring the most frequent said identification code for each stated period from the result of the detection, sending said audio data of the data block when said identification code of said data block is said most frequent identification code, holding the data value of said audio data of the immediately preceding said data block and sending it when said identification code of said data block is other than said most frequent identification code, and performing the stated interpolation process when said audio data sent out transfers to the succeeding said audio data of said data block of said most frequent identification code.

8. The reproducing method according to claim 7, wherein, on said first step, said identification code which has been respectively added to each said data block of said audio data which has been reproduced from said tape recording medium is detected, and the detected identification code is written on the stated location in the data block.

* * * * *